United States Patent
Sueyoshi et al.

(10) Patent No.: US 7,050,870 B2
(45) Date of Patent: May 23, 2006

(54) REPRODUCTION APPARATUS AND MUSIC DELIVERY SYSTEM

(75) Inventors: Masahiro Sueyoshi, Hirakata (JP); Masaharu Matsumoto, Katano (JP); Takeshi Fujita, Takatsuki (JP); Takashi Katayama, Hirakata (JP); Kazutaka Abe, Toyonaka (JP); Kosuke Nishio, Moriguchi (JP); Akihisa Kawamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 883 days.

(21) Appl. No.: 09/982,272

(22) Filed: Oct. 17, 2001

(65) Prior Publication Data
US 2002/0049509 A1 Apr. 25, 2002

(30) Foreign Application Priority Data
Oct. 20, 2000 (JP) .............................. 2000-322019

(51) Int. Cl.
G06F 17/00 (2006.01)
G06F 15/173 (2006.01)
H04H 7/00 (2006.01)

(52) U.S. Cl. ..................... 700/94; 709/238; 709/240; 455/3.06

(58) Field of Classification Search ............... 709/239, 709/240, 217, 219; 704/104, 200, 260, 277; 700/94; 340/219, 825.25; 381/11, 2, 77; 455/3.06

See application file for complete search history.

(56) References Cited

U.S. PATENT DOCUMENTS

| | | | | |
|---|---|---|---|---|
| 5,754,783 | A | * | 5/1998 | Mendelson et al. ......... 709/217 |
| 6,128,652 | A | * | 10/2000 | Toh et al. ................... 709/219 |
| 6,241,612 | B1 | * | 6/2001 | Heredia ....................... 463/42 |
| 6,330,593 | B1 | * | 12/2001 | Roberts et al. ............. 709/217 |
| 6,349,329 | B1 | * | 2/2002 | Mackintosh et al. ........ 709/219 |
| 6,647,417 | B1 | * | 11/2003 | Hunter et al. ............... 709/225 |
| 6,816,909 | B1 | * | 11/2004 | Chang et al. ............... 709/231 |

\* cited by examiner

*Primary Examiner*—Huyen Le
*Assistant Examiner*—Andrew C. Flanders
(74) *Attorney, Agent, or Firm*—Snell & Wilmer L.L.P.

(57) ABSTRACT

A reproduction apparatus includes a read section for reading a first data unit from a recording medium having the first data unit recorded thereon; a communication section for receiving a second data unit in accordance with a communication condition with a server; a synthesis section for, when the communication section cannot receive the second data unit in accordance with the communication condition, outputting the first data unit as a first output data unit, and when the communication section can receive the second data unit in accordance with the communication condition, synthesizing the first data unit and the second data unit so as to generate a synthesis data unit and outputting the synthesis data unit as a second output data unit; and a reproduction section for reproducing the first output data unit and the second output data unit.

7 Claims, 10 Drawing Sheets

REPRODUCTION APPARATUS AND MUSIC DELIVERY SYSTEM

BACKGROUND OF THE INVENTION

1. Field of the Invention

The present invention relates to a reproduction apparatus for reproducing acoustic data by synthesizing data read from a recording medium and data received through wireless communication, and a music delivery system including such a reproduction apparatus.

2. Description of the Related Art

Conventionally known reproduction apparatuses for reproducing music programs include, for example, compact disc (CD) reproduction apparatuses, mini-disc (MD) reproduction apparatuses, and digital broadcast receivers.

CD reproduction apparatuses and MD reproduction apparatuses reproduce acoustic data which is stored on recording media such as CDs and MDs.

Digital broadcast receivers reproduce acoustic data by receiving encoded acoustic data with a receiver (wireless communication device) and expanding the acoustic data inside the receiver.

Recently, music delivery services have been provided using the Internet or the like. In such music delivery services, encoded acoustic data is downloaded by a communication device (wireless or wired device) and temporarily stored on a recording medium (e.g., a hard disc). The acoustic data is reproduced by expanding the acoustic data stored on the recording medium.

Reproduction of acoustic data using reproduction apparatuses for reproduction of acoustic data stored on a recording medium, such as CD reproduction apparatuses, MD reproduction apparatuses, and the like, has the following problem. Since the capacity of recording media is limited, a required amount of acoustic data may not be recorded on the recording medium. An amount of acoustic data recordable on a recording medium is represented by, for example, a total reproduction time of the acoustic data as follows. For example, in the case of a CD system of recording acoustic data encoded by a PCM system without compression, the total reproduction time of acoustic data recordable on one recording medium is about 80 minutes. In the case of an MD system of recording acoustic data encoded by the PCM system on a recording medium smaller than a CD with compression, the total reproduction time of acoustic data is also about 80 minutes.

A reproduction apparatus for receiving acoustic data by a communication device, such as a digital broadcast receiver, has a problem that when the receiving state is deteriorated, noise or gap is generated and as a result, the sound quality is lowered. The reason for this is because when the receiving state is deteriorated, the information to be expanded is missed and thus expansion cannot be performed.

A music delivery service using the Internet or the like has a problem that acoustic data cannot be reproduced until the acoustic data is completely downloaded. The reason for this is that when reproduction of the acoustic data is begun while the acoustic data is still downloaded, deterioration of the communication condition may occur and the subsequent acoustic data cannot be received, in which case reproduction of the acoustic data is disrupted.

SUMMARY OF THE INVENTION

According to one aspect of the invention, a reproduction apparatus includes a read section for reading a first data unit from a recording medium having the first data unit recorded thereon; a communication section for receiving a second data unit in accordance with a communication condition with a server; a synthesis section for, when the communication section cannot receive the second data unit in accordance with the communication condition, outputting the first data unit as a first output data unit, and when the communication section can receive the second data unit in accordance with the communication condition, synthesizing the first data unit and the second data unit so as to generate a synthesis data unit and outputting the synthesis data unit as a second output data unit; and a reproduction section for reproducing the first output data unit and the second output data unit. The first data unit and the second data unit are constructed so that a sound quality of reproduction of the second output data unit is higher than a sound quality of reproduction of the first output data unit.

In one embodiment of the invention, the read section reads, from the recording medium, an access data unit for requesting the server for transmission of the second data unit.

In one embodiment of the invention, the first data unit, the second data unit, and the access data unit correspond to a common music program which is common to the first data unit and the second data unit, and the access data unit includes inherent information representing attribute information of the common music program.

In one embodiment of the invention, the recording medium has a plurality of first data units respectively corresponding to a plurality of music programs. The reproduction apparatus further includes a selection section for displaying the inherent information of the access data unit corresponding to each of the plurality of music programs and receiving an input for designating the music program based on the inherent information displayed.

In one embodiment of the invention, the recording medium has at least a portion of the second data unit recorded thereon. The read section reads at least a portion of the first data unit and the at least a portion of the second data unit from the recording medium in at least a portion of a reproduction time period. The synthesis section synthesizes the at least a portion of the first data unit and the at least a portion of the second data unit in the at least a portion of the reproduction time period regardless of the communication condition with the server.

In one embodiment of the invention, the first data unit is divided into a plurality of blocks along a time axis, the second data unit is divided into a plurality of blocks respectively corresponding to the plurality of blocks of the first data unit, and the synthesis section sequentially synthesizes the first data unit and the second data unit on a block-by-block basis.

According to another aspect of the invention, a music delivery system includes a reproduction apparatus; and a server for providing information to the reproduction apparatus. The reproduction apparatus includes a read section for reading a first data unit from a recording medium having the first data unit recorded thereon; a first communication section for receiving a second data unit in accordance with a communication condition with a server; a synthesis section for, when the communication section cannot receive the second data unit in accordance with a communication condition, outputting the first data unit as a first output data unit, and when the communication section can receive the second data unit in accordance with a communication condition, synthesizing the first data unit and the second data unit so as to generate a synthesis data unit and outputting the synthesis data unit as a second output data unit; and a reproduction section for reproducing the first output data unit and the second output data unit. The server includes a storage section for storing the second data unit; and a second communication section for sending the second data unit to the reproduction apparatus. The first data unit and the second data unit are constructed so that a sound quality of reproduction of the second output data unit is higher than a sound quality of reproduction of the first output data unit.

Thus, the invention described herein makes possible the advantages of providing a reproduction apparatus for providing at least a prescribed level of sound quality (for example, a lowest permissible level of sound quality) even when a reception state is deteriorated and increasing the total reproduction time of the acoustic data recorded on a recording medium having a limited capacity, and a music delivery system including such a reproduction apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

A music delivery system according to a first example of the present invention will be described.

Figure 1A:
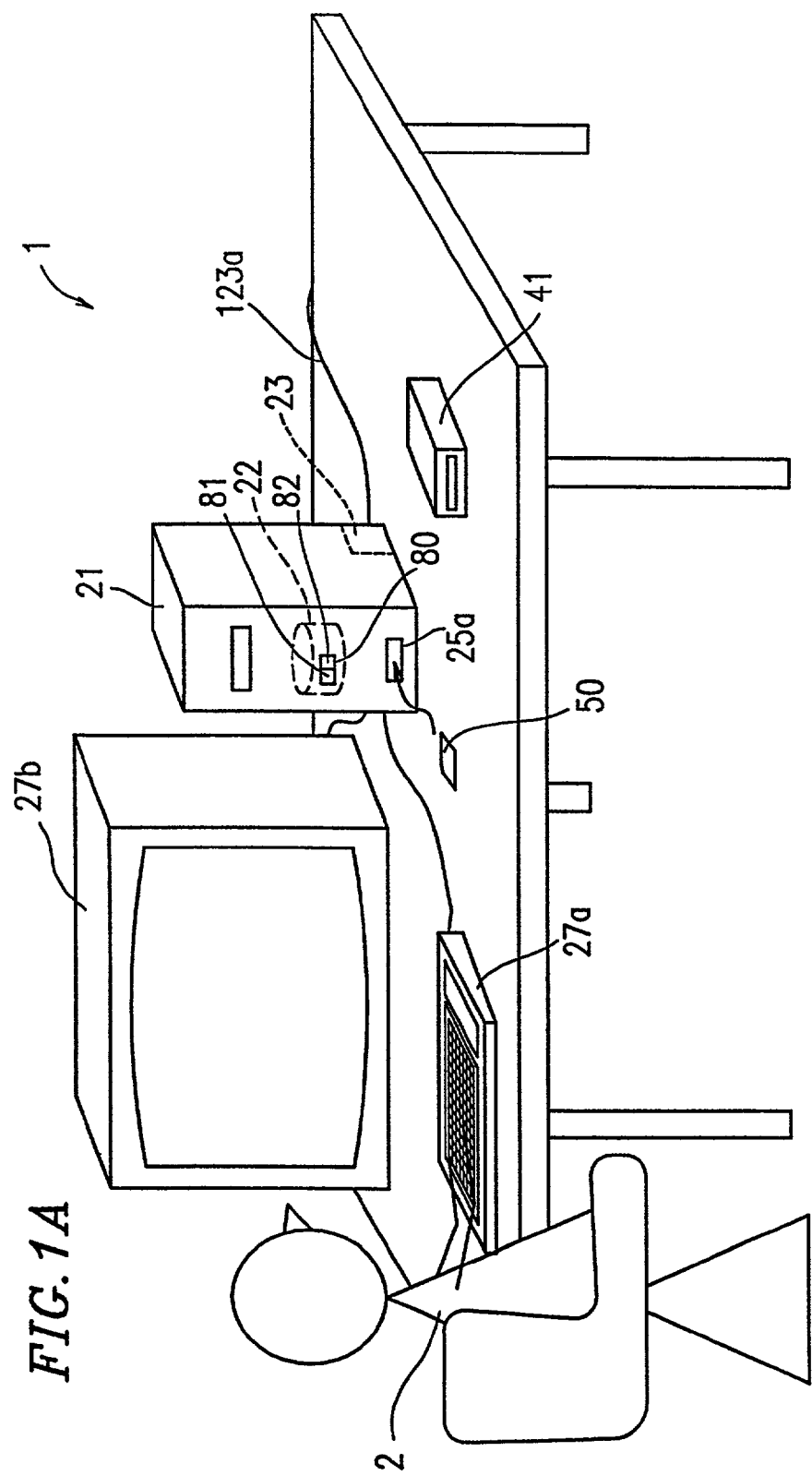
FIG. 1A shows a structure of a music delivery system 1 according to the present invention.

FIG. 1A shows a structure of a music delivery system 1 according to the first example. The music delivery system 1 includes a server 21 and a reproduction apparatus 41.

The server 21 includes a storage section 22 for storing an acoustic data unit corresponding to a music program and a communication section 23 for communicating with the reproduction apparatus 41.

The storage section 22, which is accommodated in the server 21, is shown by dashed lines in FIG. 1A. The server 21 is connected to an input device 27a such as, for example, a keyboard and an output device 27b such as, for example, a display.

The server 21 can be, for example, a personal computer. The storage section 22 can be, for example, a hard disc.

The communication section 23 can be, for example, a modem. The communication section 23 is connected to a communication line (for example, a telephone line) 123a.

The reproduction apparatus 41 is constructed so that a recording medium 50 is mountable thereon. The reproduction apparatus 41 has a function of reproducing an acoustic data unit recorded on the recording medium 50.

The recording medium 50 can be a semiconductor recording medium such as, for example, a flash memory or an SD memory card.

Hereinafter, how to use the music delivery system 1 (steps 1 through 4 below) will be described.

1. Install an acoustic data unit 80 on the server 21.

The acoustic data unit 80 corresponding to a music program is stored in a storage section 22 of the server 21. The acoustic data unit 80 can be stored by, for example, downloading the acoustic data unit 80 to the server 21 via the Internet. Alternatively, the acoustic data unit 80 can already be stored in the storage section 22 when a user 2 purchases the server 21.

2. Copy a portion of the acoustic data unit 80 from the server 21 to the recording medium 50.

The acoustic data unit 80 shown in FIG. 1A includes an acoustic data portion 81 (first data unit) and an acoustic data portion 82 (second data unit). Only the acoustic data portion 81 is copied onto the recording medium 50. Such copying can be performed by, for example, the user 2 inserting the recording medium 50 into an opening 25a of the server 21 and then operating the input device 27a.

The storage section 22 of the server 21 can store a plurality acoustic data units 80 corresponding to a plurality of music programs. The user 2 can select a desired music program from the plurality of music programs and copy the acoustic data portion 81 included in the acoustic data unit 80 corresponding to the desired music program from the server 21 to the recording medium 50. Such selection and copying can be performed by, for example, selecting, using the input device 27a, a desired music program from a list of the plurality of music programs displayed by the output device 27b and then inputting a "copy command".

The acoustic data portion 81 and the acoustic data portion 82 are constructed so that the sound quality of reproduction of a synthesis data unit which is obtained by synthesizing the acoustic data portion 81 and the acoustic data portion 82 is higher than the sound quality of reproduction of the acoustic data portion 81. It is guaranteed that the sound quality of reproduction of the acoustic data portion 81 is a prescribed level (for example, a minimum permissible level) or higher.

3. Mount the recording medium 50 onto the reproduction apparatus 41.

The recording medium 50 having a portion of the acoustic data unit 80 (the acoustic data portion 81) copied thereon in step 2 is mounted on the reproduction apparatus 41.

4. Reproduce the data with the reproduction apparatus 41

Figure 1B:
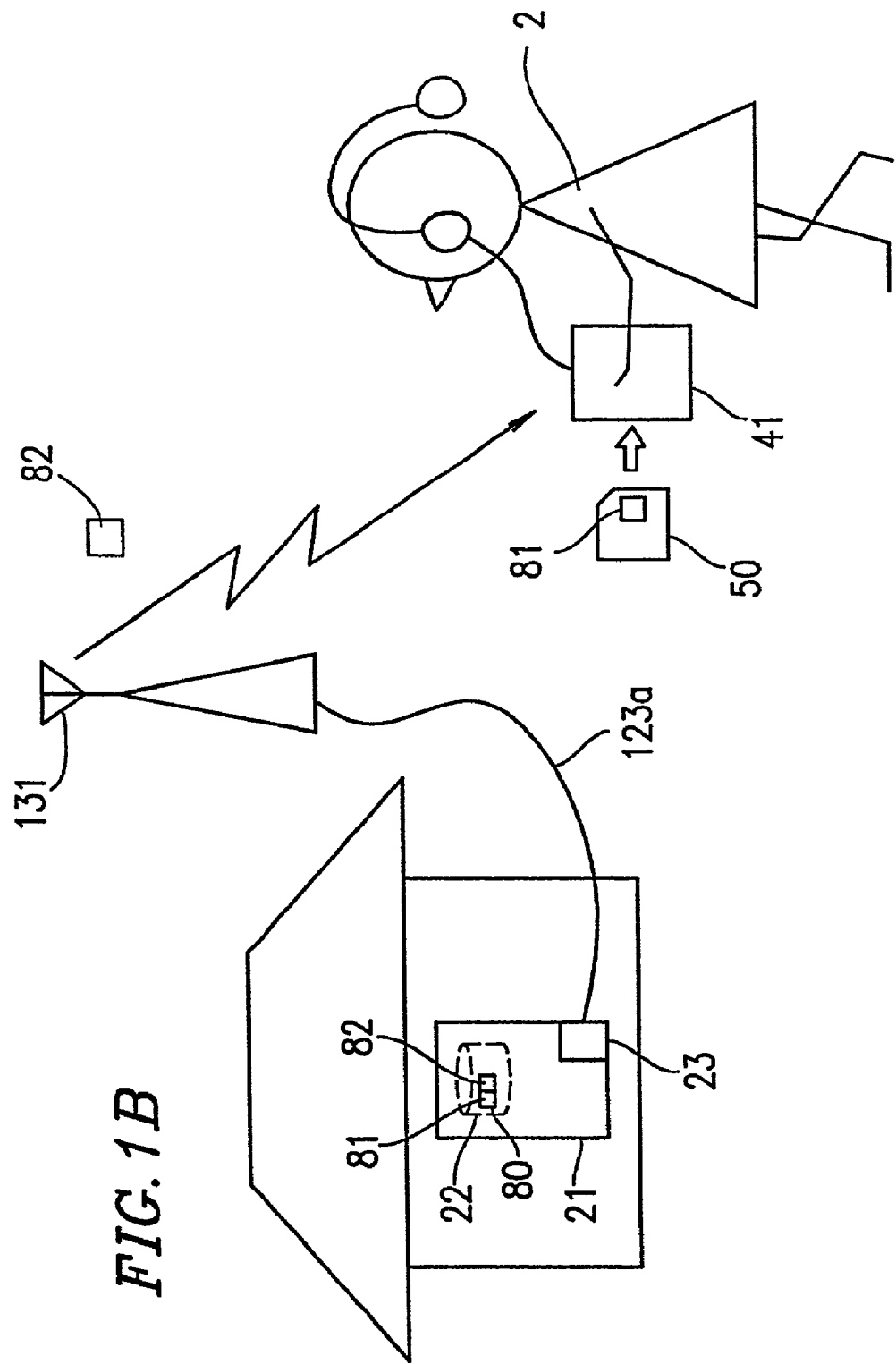
FIG. 1B shows a state in which the music delivery system 1 shown in FIG. 1A is used.

FIG. 1B shows a state in which the music delivery system 1 is usable. In this example, the server 21 is installed in the house of the user 2, and the user 2 reproduces data recorded on the recording medium 50 mounted on the reproduction apparatus 41 away from the location of the server 21, i.e., outside the house in FIG. 1B.

When the user 2 wants to reproduce the data recorded on the recording medium 50, the user 2 performs a prescribed operation on the reproduction apparatus 41 (for example, presses a "play" button). In response to the operation, communication is established between the reproduction apparatus 41 and the server 21.

When communication is established between the reproduction apparatus 41 and the server 21, the acoustic data portion 82 is sent from the server 21 to the reproduction apparatus 41. The reproduction apparatus 41 can sometimes receive the acoustic data portion 82, but sometimes cannot receive the acoustic data portion 82, depending on the communication condition between the reproduction apparatus 41 and the server 21. When the reproduction apparatus 41 can receive the acoustic data portion 82, the reproduction apparatus 41 synthesizes the acoustic data portion 81 read from the recording medium 50 and the received acoustic data portion 82 to generate a synthesis data unit, and reproduces the synthesis data unit.

In the example shown in FIG. 1B, the server 21 and a terrestrial station 131 are connected to each other by a communication line 123a, and thus wireless communication is established between the terrestrial station 131 and the reproduction apparatus 41. Alternatively, wireless communication can be established between the server 21 and the reproduction apparatus 41 directly. Thus, the reproduction apparatus 41 receives data from the server 21 through the wireless communication. Therefore, the user 2 can reproduce data with the reproduction apparatus 41 at a desired location away from the server 21. The wireless communication can be, for example, communication via a cellular phone or communication via a PHS (personal handy-phone system).

When the reproduction apparatus 41 cannot receive the acoustic data portion 82 sent from the server 21 through the wireless communication for some reason such as, for example, deterioration in the communication condition, the reproduction apparatus 41 only reproduces the acoustic data portion 81 read from the recording medium 50 without synthesizing the acoustic data portion 81 and other data. The sound quality in this case is lower than the synthesis data unit, but is guaranteed to be at a prescribed level (e.g., a minimum permissible level) or higher.

FIGS. 1A and 1B show only a typical structure and typical state of use of the reproduction apparatus and music delivery system according to the present invention. The present invention is not limited to the structure and state of use shown in FIGS. 1A and 1B.

For example, the recording medium 50 can be a floppy disc, an MO, an MD, a CD-ROM, a CD-R or the like instead of a semiconductor recording medium. Alternatively, the recording medium 50 can be incorporated in the reproduction apparatus 41. In this case, the processing of copying a portion of the acoustic data unit 80 stored in the storage section 22 of the server 21 onto the recording medium 50 can be performed by connecting the server 21 and the reproduction apparatus 41 to each other by a cable (not shown) and transferring the portion of the acoustic data unit 80 from the server 21 to the recording medium 50 incorporated in the reproduction apparatus 41 through the cable.

The storage section 22 is not limited to a hard disc. The storage section 22 can be, for example, a DVD-ROM.

The server 21 is not limited to being installed in a house. For example, the server 21 can be installed in an office of a company providing a music delivery service using the music delivery system 1. The server 21 is typically a remote server located away from the reproduction apparatus 41.

In the above example, the acoustic data portion 81 is copied from the storage section 22 of the server 21 onto the recording medium 50 by the user 2. Alternatively, the first data of the acoustic data unit 80 corresponding to a desired music program can be recorded on the recording medium 50 in advance instead of being copied on the recording medium 50 by the user 2. In this case, the acoustic data portion 81 need not be recorded in the storage section 22 of the server 21.

An acoustic data unit usable in the reproduction apparatus and the music delivery system according to the present invention includes at least a first data unit and a second data unit, which are constructed so that the sound quality of reproduction of a synthesis data unit which is obtained by synthesizing the first data unit and the second data unit is higher than the sound quality of reproduction of the first data unit, and so that the sound quality of reproduction of the first data unit is guaranteed to be at a prescribed level (for example, a minimum permissible level) or higher. Any such acoustic data unit having any structure can be used according to the present invention. Such data unit can be, for example, an acoustic data unit having a data structure which is hierarchy-encoded defined by the MPEG-4 Standards. In the following description, the acoustic data unit has a hierarchy-encoded data structure.

Figure 2:
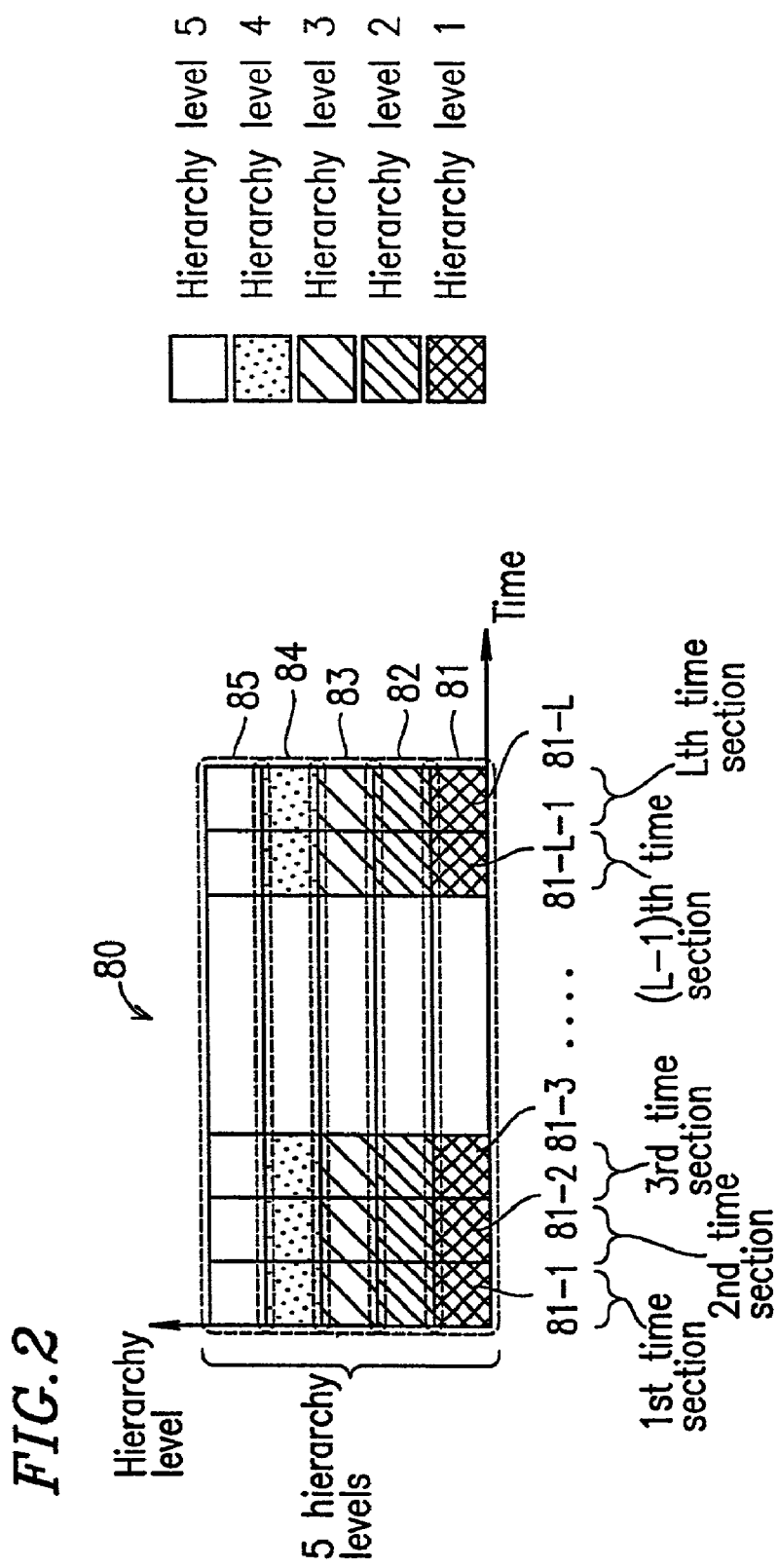
FIG. 2 shows a data structure of an acoustic data unit 80 corresponding to a specific music program.

FIG. 2 shows a structure of the acoustic data unit 80 corresponding to a specific-music program. The acoustic data unit 80 includes K hierarchy data units from hierarchy level 1 through hierarchy level K (K=5 in FIG. 2). The sound quality of reproduction of a data unit obtained by decoding the hierarchy data unit of hierarchy level 1 (first data unit) is lower than reproduction of a synthesis data unit, which is obtained by decoding the hierarchy data unit of hierarchy level 1 (first data unit) and at least one of the hierarchy data units of hierarchy levels 2 through K (each being a second data unit) and synthesizing the decoded hierarchy data units. Here, K may represent a natural number of two or greater.

When the hierarchy data unit of hierarchy level 1 is decoded and the decoded hierarchy data unit is reproduced, it is guaranteed that the sound quality of a prescribed level (e.g., a minimum permissible level) or higher is obtained.

In the following description, the expression "reproduction of acoustic data" refers to both (i) decoding the hierarchy data unit of hierarchy level 1 included in the acoustic data unit and reproducing the decoded hierarchy data unit and (ii) decoding the hierarchy data unit of hierarchy level 1 and at least one of the hierarchy data units of hierarchy levels 2 through K and reproducing the synthesis data unit obtained by synthesizing the decoded data units.

When the hierarchy data units of hierarchy levels 1 through K included in the acoustic data unit 80 are each decoded and a synthesis data unit obtained by synthesizing all of the decoded hierarchy data units is reproduced, the highest sound quality is obtained among sound qualities obtained by decoding and reproducing the acoustic data unit in every possible manner. Such a highest sound quality is referred to as a "maximum sound quality".

The acoustic data unit 80 shown in FIG. 2 includes a hierarchy data unit 81 of hierarchy level 1 and hierarchy data units 82 through 85 of hierarchy levels 2 through 5.

In FIG. 2, the horizontal axis represents a time axis of reproduction of the acoustic data unit 80, and the vertical axis represents the hierarchy level of the hierarchy data units included in the acoustic data unit 80.

The hierarchy data unit 81 of hierarchy level 1 is divided into L blocks 81-1 through 81-L respectively corresponding to L time sections on the time axis (first time section through the Lth time section). The hierarchy data units 82 through 85 of hierarchy levels 2 through 5 are each divided into L blocks respectively corresponding to the same time sections as those for the hierarchy data unit 81 of hierarchy level 1. The time sections can have an equal length or different lengths, and L is an arbitrary value.

The hierarchy data units can be decoded, synthesized and reproduced on a block-by-block basis. Namely, it is possible to decode and reproduce a block included in the hierarchy data unit of hierarchy level 1 corresponding to a particular time section. It is also possible to decode a block included in the hierarchy data unit of hierarchy level 1 corresponding to a particular time section and a block included in the hierarchy data unit of hierarchy level 2 corresponding to the particular time section and to reproduce a synthesis data unit obtained by synthesizing the decoded blocks.

By dividing each of the hierarchy data units into a plurality of time sections along the time axis, it is made possible to reproduce only a particular time section of the acoustic data.

Figure 3:
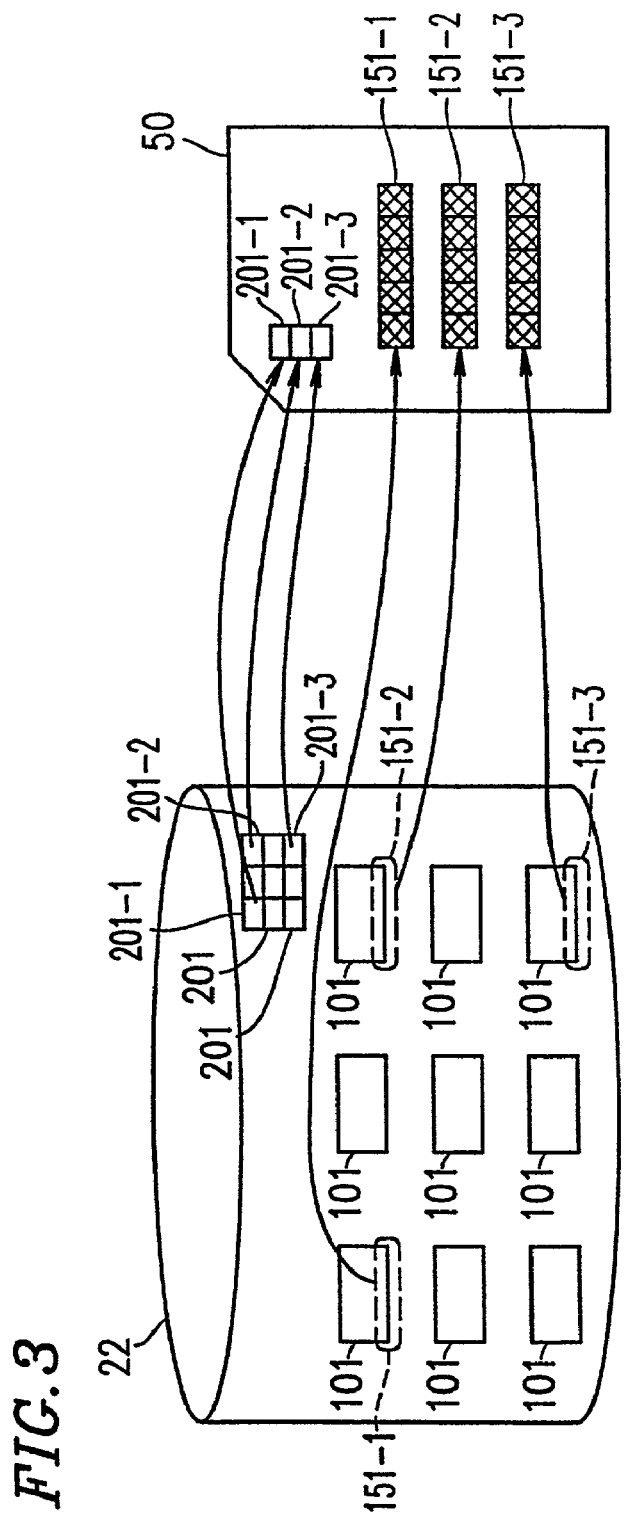
FIG. 3 shows a manner in which a hierarchy data unit of hierarchy level 1 of an acoustic data unit is copied onto a recording medium 50.

FIG. 3 shows a manner in which the hierarchy data unit of hierarchy level 1 (first data unit) is copied onto the recording medium 50. In the example shown in FIG. 3, an acoustic data unit corresponding to a desired music program is selected by the user from an acoustic data unit stored in the storage section 22, and a portion of the selected acoustic data unit (hierarchy data unit of hierarchy level 1) is copied.

The storage section 22 has N acoustic data units 101 recorded therein. Each acoustic data unit 101 is hierarchy-encoded and thus has a data structure including K hierarchy levels, like the acoustic data unit 80 shown in FIG. 2. The user selects M acoustic data units from the N acoustic data units in advance, where $1 \leq M \leq N$. The value of N is, for example, 1000, and the value of M is, for example, 100. In the example shown in FIG. 3, M=3 and N=9. Onto the recording medium 50, hierarchy data units 151-1 through 151-3 of hierarchy level 1 of the selected three acoustic data units 101 are copied. Such selection and copying can be performed by, for example, operating the input device 27*a* (FIG. 1A) to select M music programs from the list of N music programs displayed by the output device 27*b* and then inputting a "copy command".

Thus, a portion of each of at least one acoustic data unit is recorded on the recording medium 50.

The storage section 22 further has nine access data units 201 respectively corresponding to nine acoustic data units 101. On the recording medium 50, three access data units 201-1 through 201-3 corresponding to the three acoustic data units 101 selected by the user are recorded.

The access data unit 201-1, the hierarchy data unit 151-1 of hierarchy level 1 (first data unit), and the hierarchy data units of hierarchy levels 2 through K of the acoustic data unit 101 including the hierarchy data unit 151-1 (each being a second data unit) correspond to a common music program. The access data unit 201-1 includes an inherent information section representing attribute information of the common music program of the acoustic data unit 101.

Figure 4:
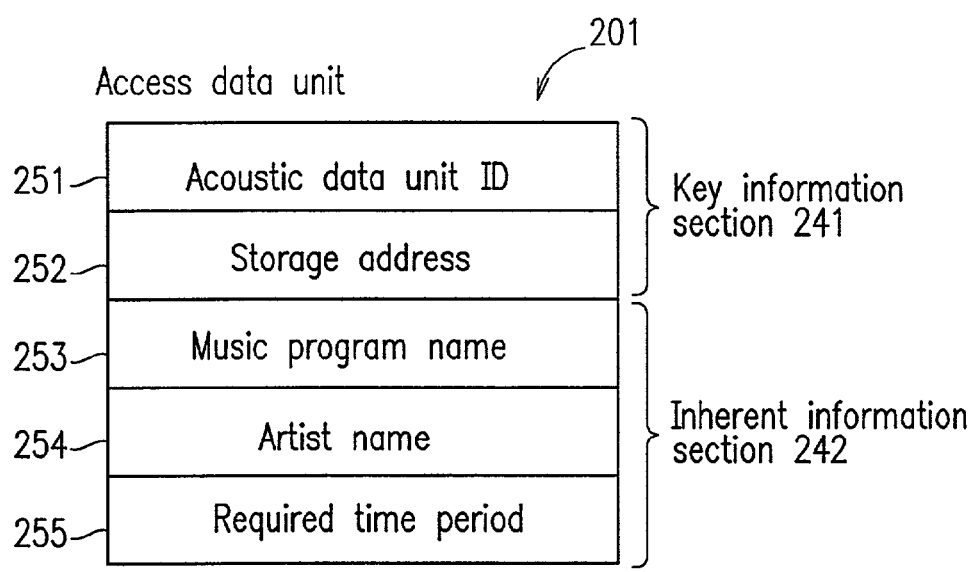
FIG. 4 shows a data structure of an access data unit 201.

FIG. 4 shows an exemplary data structure of the access data unit 201. One access data unit 201 corresponds to each of N acoustic data units stored in the storage section 22.

The access data unit 201 includes a key information section 241 and an inherent information section 242. The key information section 241 includes information representing information used for allowing the reproduction apparatus 41 to access the hierarchy data units of hierarchy levels 2 through K in the server 21 for reproducing the acoustic data unit 101. The inherent information section 242 includes information representing attribute information of a music program corresponding to the acoustic data.

The key information section 241 includes an acoustic data unit ID 251 and a storage address 252. The acoustic data unit ID 251 is used for specifying the acoustic data unit in the server 21 and the reproduction apparatus 41. The storage address 252 represents an address in the storage section 22 storing the acoustic data.

The inherent information section 242 includes a music program name 253, an artist name 254, and a required time period 255. The music program name 253 represents, for example, the tune title of the music program corresponding to the acoustic data. The artist name 254 represents the performer of the music program. The required time period 255 represents the time period required for reproducing the acoustic data.

Figure 5:
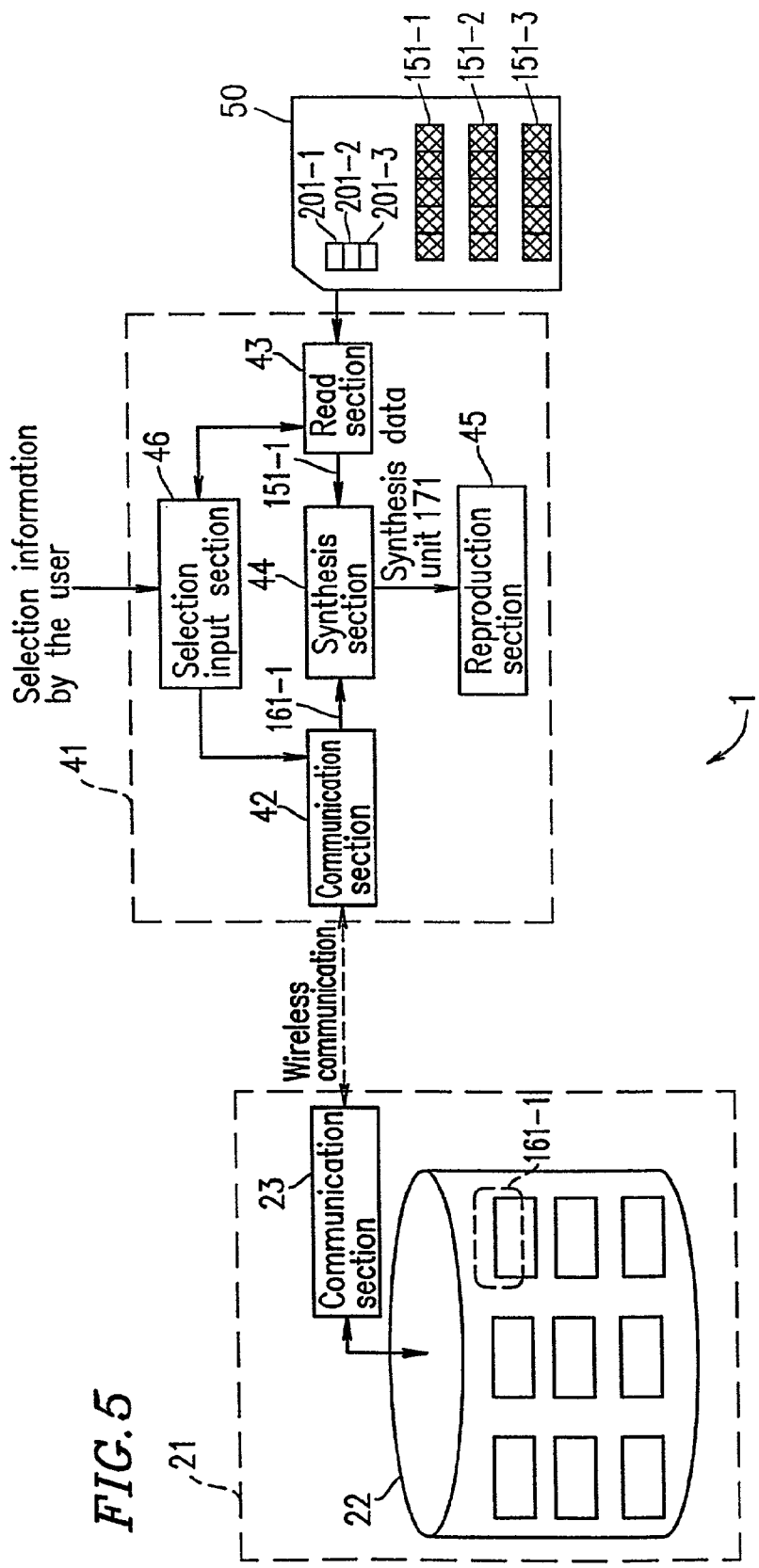
FIG. 5 is a block diagram illustrating a detailed structure of the music delivery system 1 shown in FIG. 1A.

Hereinafter, reproduction of an acoustic data unit by the reproduction apparatus 41 will be described with reference to FIG. 5.

As described above, the music delivery system 1 includes the reproduction apparatus 41 and the server 21.

The server 21 includes the communication section (second communication section) 23 for communicating with the reproduction apparatus 41 and the storage section 22 for storing acoustic data units of music programs (for example, hierarchy data units of hierarchy levels 1 through K).

The reproduction apparatus 41 includes a communication section (first communication section) 42 for performing wireless communication with the server 21 and receiving hierarchy data units of hierarchy levels 2 through K (second data unit) through the wireless communication, a read section 43 for reading the hierarchy data unit of the hierarchy level 1 (first data unit) from the recording medium 50, a synthesis section 44 for decoding the second data unit received by the communication section 42 and the first data unit read by the read section 43 and synthesizing the decoded data units to generate a synthesis data unit, a reproduction section 45 for reproducing the synthesis data unit, and a selection input section 46 for allowing the user to select an acoustic data unit to be reproduced.

The reproduction section 45 can have any known structure for performing prescribed signal processing on the synthesis data unit so as to output voice to a speaker and/or headphones (not shown).

The selection input section 46 can be, for example, any user interface having a display section (not shown).

The acoustic data unit can be reproduced by the reproduction apparatus 41 as described in the following steps S101 through S110.

Step S101: The user places the recording medium 50 in the reproduction apparatus 41.

Step S102: In response to the recording medium 50 being placed in the reproduction apparatus 41, the read section 43 reads the access data units 201-1 through 201-3 stored on the recording medium 50.

Step S103: The content of the inherent information section 242 of each of the read access data units 201-1 through 201-3 is shown on the display section of the selection input section 46. The content can be shown on the display section in any display format. For example, the music program names 253 included in the inherent information section 242 can be displayed in alphabetical order, or the artist names 254 can be displayed in alphabetical order.

Step S104: Based on the content of the inherent information section 242 displayed, the user selects the acoustic data unit to be reproduced, and inputs selection information to the selection input section 46. The input can be performed by, for example, operating a button (not shown). The selection information represents which acoustic data unit has been selected among at least one acoustic data unit partially recorded on the recording medium 50. Here, it is assumed that the user has selected an acoustic data unit corresponding to the access data unit 201-1.

Step S105: The selection input section 46 generates a transmission request including the content of the key information section 241 of the selected access data unit 201-1. Then, the selection input section 46 outputs the transmission request to the communication section 42 and also outputs a signal indicating that the access data unit 201-1 has been selected to the read section 43. Thus, the access data unit is used for requesting the server 21 to transmit the hierarchy data units of hierarchy levels 2 through K (each being a second data unit).

Step S106: The communication section 42 establishes wireless communication with the server 21 and sends the transmission request to the communication section 23 of the server 21.

Step S107: The read section 43 reads the hierarchy data unit 151-1 of hierarchy level 1 corresponding to the access data unit 201-1 selected in step S105 from the recording medium 50. The hierarchy data units respectively corresponding to the access data units have been copied onto prescribed positions (for example, prescribed addresses) on the recording medium 50 in advance. Thus, the hierarchy data unit 151-1 of hierarchy level 1 corresponding to the access data unit 201-1 is read from the prescribed position.

The hierarchy data unit 151-1 of hierarchy level 1 is read from the recording medium 50 on a time section-by-time section basis. For example, a hierarchy data unit of hierarchy level 1 in the first time section (block) is first read from the recording medium 50. Next, a hierarchy data unit of hierarchy level 1 in the second time section is read from the recording medium 50. The timing for reading the hierarchy data unit of hierarchy level 1 in the second time section is controlled by, for example, the read section 43. Namely, the reading of the hierarchy data unit of hierarchy level 1 in the second time section begins once a prescribed time period after the start of the reading of the hierarchy data unit of hierarchy level 1 in the first time section has elapsed. The prescribed time period is the length of the first time section.

Step S108: The communication section 23 of the server 21 receives the transmission request regarding the access data unit 201-1 sent in step S106, and based on the storage address 252 of the key information section 241 of the access data unit 201-1, retrieves the acoustic data unit corresponding to the access data unit 201-1 from the N acoustic data units stored in the storage section 22. A hierarchy data unit 161-1 of hierarchy levels 2 through K of the retrieved acoustic data unit is sent from the server 21 and received by the communication section 42 through the wireless communication. Thus, the access data unit 201-1 is used for requesting the server 21 to transmit the hierarchy data units of hierarchy levels 2 through K (each being a second data unit).

The hierarchy data unit 161-1 of hierarchy levels 2 through K is sent and received on a time section-by-time section basis. For example, hierarchy data units of hierarchy levels 2 through K in the first time section (blocks) are first sent from the server 21 in this order. Next, hierarchy data units of hierarchy levels 2 through K in the second time section are sent from the server 21 in this order. Each block sent includes data representing its hierarchy level number added thereto. The timing for sending the hierarchy data units of the hierarchy levels 2 through K in the second time section is controlled by, for example, the server 21. Namely, the sending of the hierarchy data units of hierarchy levels 2 through K in the second time section begins once a prescribed time period after the start of the sending of the hierarchy data units of hierarchy levels 2 through K in the first time section has elapsed. The prescribed time period is the length of the first time section.

Step S109: The synthesis section 44 decodes the hierarchy data unit 161-1 of hierarchy levels 2 through K received by the communication section 42 and the hierarchy data unit 151-1 of hierarchy level 1 read by the read section 43, and synthesizes the decoded data units 151-1 and 161-1 so as to generate a synthesis data unit 171 (second output data unit). The synthesis data unit 171 is output to the reproduction section 45.

Step S110: The reproduction section 45 reproduces the synthesis data 171. Thus, the user can enjoy the music program.

The steps S107 through S110 are performed in parallel. Namely, while the acoustic data unit in the first time section is reproduced, the hierarchy data unit of the hierarchy level 1 in the second time section is read and also the hierarchy data units of hierarchy levels 2 through K are received. In general, while an acoustic data unit of the nth ($n \geq 2$) time section is reproduced, a hierarchy data unit of hierarchy level 1 in the (n+1)th time section is read and also hierarchy data units of hierarchy levels 2 through K are received. In this manner, the hierarchy data unit read from the recording medium 50 and the hierarchy data unit received from the server 21 are sequentially synthesized on a time section-by-time section basis, and thus the acoustic data unit is reproduced.

When the hierarchy data units of hierarchy levels 2 through K of the last time section (Lth time section) are completely received, the communication between the server 21 and the reproduction apparatus 41 is disconnected.

The display of the content of the inherent information section 242 on the display section of the selection input section 46 described in step S103 and the input of the selection information by the user can be optionally omitted. For example, the input of the selection information by the user can be omitted, in which case the reproduction section 41 reproduces M acoustic data units partially recorded on the recording medium 50 in a prescribed order.

Figure 6:
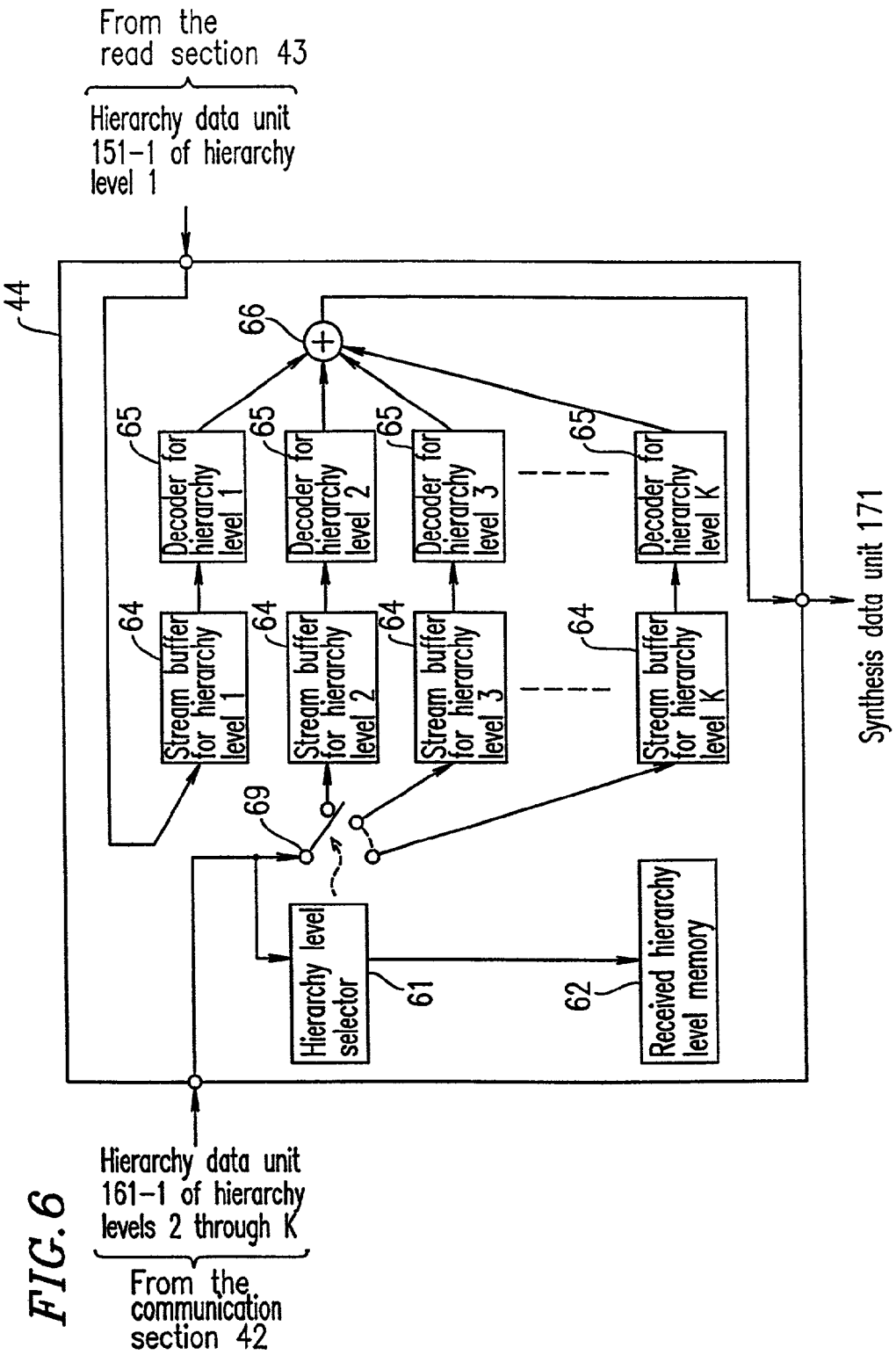
FIG. 6 is a block diagram illustrating a structure of a synthesis section 44 according to a first example of the present invention.

Hereinafter, a detailed structure of the synthesis section 44 will be described with reference to FIG. 6.

The synthesis section 44 includes a hierarchy selector 61, a received hierarchy level memory 62, stream buffers 64 for respective hierarchy levels 1 through K, and decoders 65 for respective hierarchy levels 1 through K.

The hierarchy selector 61 identifies the hierarchy level number of a hierarchy data unit and switches the switch 69 in accordance with the identified hierarchy level number. Thus, the hierarchy data unit is stored in the corresponding stream buffer 64.

The received hierarchy level memory 62 has flags respectively corresponding to hierarchy levels 2 through K. Each flag is set to be "1" by the hierarchy level selector 61 when the hierarchy data unit of the corresponding hierarchy level is stored in the corresponding stream buffer 64. Each flag is referred to by a decoder 65 when the decoder 65 for decoding the hierarchy data unit stored in the corresponding stream buffer 64 and is then set to be "0".

The number of stream buffers 64 is equal to the number K of the hierarchy levels. Each stream buffer 64 stores the hierarchy data unit of the corresponding hierarchy level (block) in one time section.

The number of decoders 65 is also equal to the number of the hierarchy levels. Each decoder 65 decodes the hierarchy data unit of the corresponding hierarchy level. Prior to the decoding processing, the decoder 65 refers to the corresponding flag of the received hierarchy level memory 62. When the flag is "1", the decoder 65 decodes and outputs the hierarchy data unit stored in the corresponding stream buffer 64. When the flag is not "1", the decoder 65 outputs "0". The hierarchy data units decoded by the decoders 65 are synthesized by a synthesis device 66 and are output to the reproduction section 45 as the synthesis data unit 171.

In this manner, the received hierarchy level memory 62 includes data representing the hierarchy level or levels, the hierarchy data unit of which has been received, and the hierarchy level or levels, the hierarchy data unit of which has not been received regarding the next time section for reproduction, as described in detail below.

The operation of the synthesis section 44 in step S109 will be described in more detail in steps S601 through S605 below.

Step S601: The hierarchy data unit of hierarchy level 1 in the first time section read from the recording medium 50 is stored in the corresponding stream buffer 64.

Step S602: The hierarchy data units of hierarchy levels 2 through K in the first time section (blocks) sent from the server 21 are received and stored in the corresponding stream buffers 64. Each block includes data representing its hierarchy level number added thereto. Based on the added data, each block is stored in the stream buffer 64 corresponding to the hierarchy level number represented by the data.

When the data representing the hierarchy level number is changed (for example, when the hierarchy level number is increased), it is determined that the hierarchy data unit of the hierarchy level number before the change is completed. The flag of the received hierarchy level memory 62 corresponding to the hierarchy level number is set to "1". The hierarchy data units of hierarchy levels 2 through K (blocks) may or may not be received depending on the communication condition with the server 21. A flag set to be "1" indicates that the hierarchy data unit of the corresponding hierarchy level has been received. A flag set to be "0" indicates that the hierarchy data unit of the corresponding hierarchy level has not been received.

Step S603: The decoders 65 for hierarchy levels 2 through K refer to the values of the flags of the received hierarchy level memory 62.

Step S604: The decoder 65 for hierarchy level 1 decodes the block stored in the stream buffer 64 for hierarchy level 1. The decoder(s) 65 for the hierarchy level(s), among the decoders 65 for hierarchy levels 2 through K, corresponding to a flag of "1" of the received hierarchy level memory 62 decodes the blocks stored in the corresponding stream buffer(s) 64. The decoder(s) 65 for the hierarchy level(s) corresponding to a flag of "0" of the received hierarchy level memory 62 outputs "0".

Step S605: The outputs from the decoders 65 for hierarchy levels 1 through K produced in step S604 are synthesized by the synthesis device 66, and the synthesis data unit (second output data unit) is output to the reproduction section 45.

In step S604, among the hierarchy data units of hierarchy levels 2 through K, only the hierarchy data unit (s) of the hierarchy level corresponding to a flag of "1" (the hierarchy data unit(s) of the hierarchy level(s) which is completely received) influences the synthesis data unit 171. The reason for this is because the decoder 25 corresponding to the hierarchy data unit(s) of the hierarchy levels which has not been completely received outputs "0". When none of the hierarchy data units of hierarchy levels 2 through K can be received, the hierarchy data units of hierarchy levels 2 through K do not influence the synthesis data unit 171. The synthesis data unit 171 obtained in this case is equal to the data unit obtained by decoding the hierarchy data unit of hierarchy level 1 (first data unit). In this manner, when none of the hierarchy data units of hierarchy levels 2 through K can be received, the synthesis section 44 outputs the data unit obtained by decoding the hierarchy data unit of hierarchy level 1 as a first output data unit.

When the hierarchy data unit of at least one of hierarchy levels 2 through K can be received, the synthesis section 44 decodes the hierarchy data unit of the hierarchy level received (second data unit) and the hierarchy data unit of hierarchy level 1, and outputs a synthesis data unit obtained by synthesizing the decoded hierarchy data units as a second output data unit.

According to the above-described structure, it is not necessary to record the hierarchy data units of all hierarchy levels of the acoustic data unit on the recording medium 50. Therefore, the capacity of the recording medium 50 required for recording an acoustic data unit corresponding to a music program can be reduced. As a consequence, a recording medium having a limited capacity can have acoustic data units corresponding to a larger number of music programs recorded thereon, which is convenient to reproduction away from the server 21. For example, where the acoustic data unit 101 has five hierarchy levels and the hierarchy data units of the five hierarchy levels are equal to each other, the size of the hierarchy data unit of hierarchy level 1 recorded on the recording medium 50 is $\frac{1}{5}$ of the size of the acoustic data unit 101. Accordingly, a recording medium having a given capacity can have acoustic data units for a reproduction time period five times longer than the case where the entire acoustic data unit 101 is recorded on the recording medium.

The recording medium 50 has the hierarchy data unit of hierarchy level 1 with all time sections of the acoustic data unit recorded thereon. Even when the communication condition is deteriorated during the reproduction of the acoustic data unit and as a result, the hierarchy data units of hierarchy levels 2 through K cannot be continued to be received, the hierarchy data unit of hierarchy level 1 is reproduced. Therefore, the user can enjoy the music program uninterrupted. The reason for this is that the hierarchy data unit of hierarchy level 1 is recorded on the recording medium 50 and therefore can be stably read regardless of the communication condition. Due to such a system, the sound quality of a prescribed level (for example, a minimum permissible level) or higher can be guaranteed. Even when the communication condition is deteriorated, the problem of reproduction of the acoustic data unit being disrupted does not occur.

As described above in step S108, the timing for sending the hierarchy data units of hierarchy levels 2 through K in each time section is controlled by the server 21. In other words, the server 21 sequentially starts sending the hierarchy data units of hierarchy levels 2 through K in each time section over time as the acoustic data unit is reproduced. Therefore, after the reproduction apparatus 41 sends the content of the key information section 241 to the server 21 at the start of reproduction of the acoustic data unit (step S106), the reproduction apparatus 41 need not send data until the reproduction of the acoustic data unit is completed. Since the communication section 42 need only to receive data during the reproduction of the acoustic data unit, an advantage that the load on the communication section 42 is relatively small is provided.

In the above description, the acoustic data unit has an encoded hierarchical structure. The present invention is applicable to acoustic data units having different data structures. The acoustic data unit need not be encoded or need not have a hierarchical data structure. The present invention is applicable to any acoustic data unit including at least a first data unit and a second data unit, which are constructed so that the sound quality of reproduction of a synthesis data unit which is obtained by synthesizing the first data unit and the second data unit is higher than the sound quality of reproduction of the first data unit, and so that the sound quality of reproduction of the first data unit is guaranteed to be at a prescribed level (for example, a minimum permissible level) or higher. In the case where the acoustic data unit is not encoded, the decoding processing described above is omitted.

Encoding the acoustic data unit is preferable for reducing the size of the acoustic data unit.

The reproduction apparatus according to the present invention can reproduce a video data unit together with an acoustic data unit. In this case, the present invention is applicable also to the video data unit so long as the video data unit includes a first data unit and a second data unit, which are constructed so that the image quality of reproduction of a synthesis data unit which is obtained by synthesizing the first data unit and the second data unit is higher than the image quality of reproduction of only the first data unit, and so that the image quality of reproduction of the first data unit is guaranteed to be at a prescribed level (for example, a minimum permissible level) or higher.

EXAMPLE 2

In the first example of the present invention, the reproduction apparatus 41 does not send to the server 21 any data while an acoustic data unit is being reproduced. In a second example of the present invention, the reproduction apparatus sends data even while an acoustic data unit is being reproduced.

Figure 7:
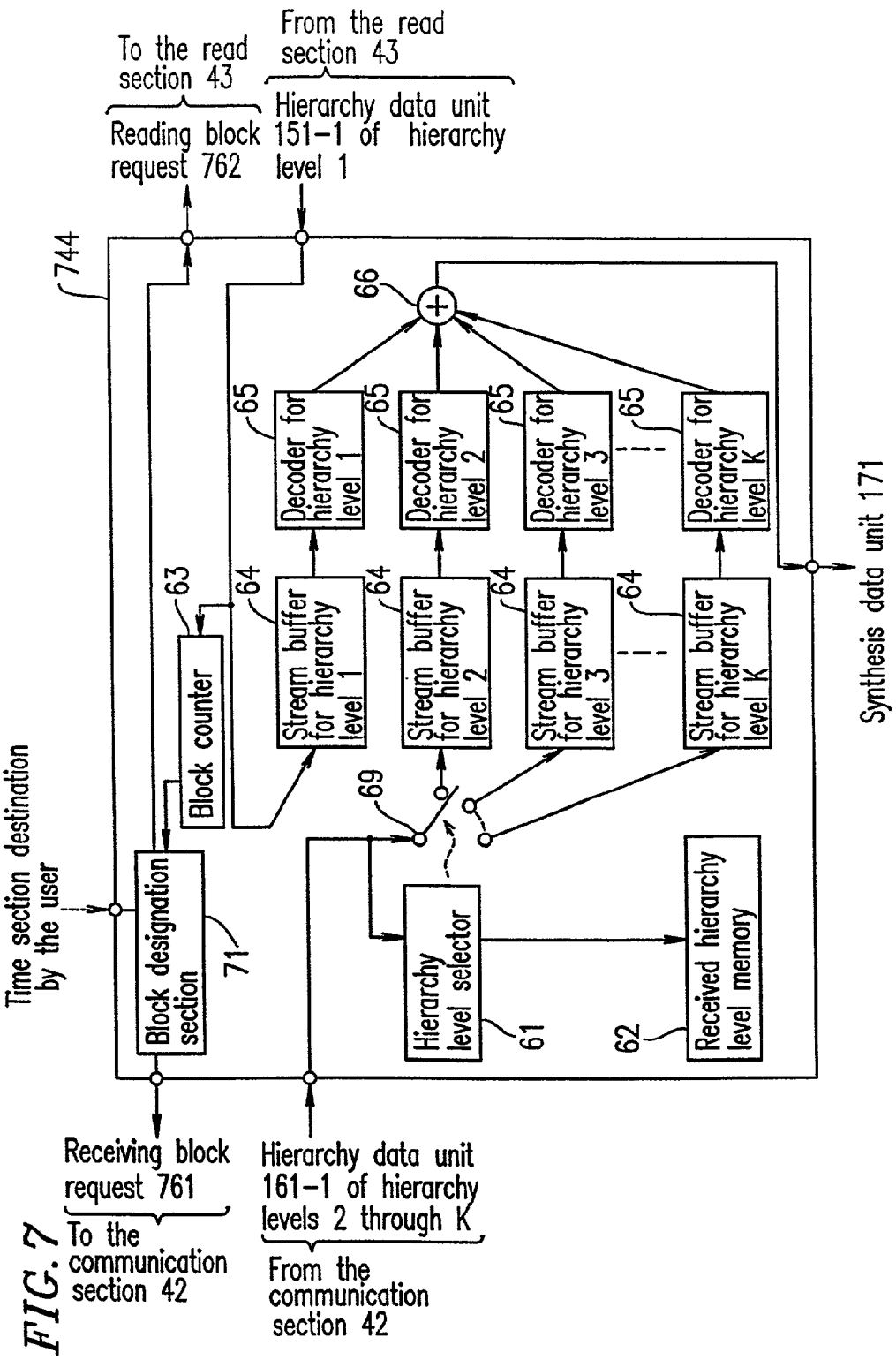
FIG. 7 is a block diagram illustrating a structure of a synthesis section 744 according to a second example of the present invention.

FIG. 7 shows a structure of a synthesis section 744 according to the second example of the present invention. The synthesis section 744 can be used, for example, instead of the synthesis section 44 described in the first example. In FIG. 7, identical elements previously discussed with respect to FIG. 6 bear identical reference numerals and the detailed descriptions thereof are omitted.

The synthesis section 744 includes a block counter 63 and a block designation section 71.

The reproduction apparatus in the second example performs processing similar to that of the reproduction apparatus 41 in the first example except that the following steps S1107 and S1108 are performed instead of steps S107 and S108.

Step S1107: The read section 43 reads the hierarchy data unit 151-1 of hierarchy level 1 corresponding to the access data unit 201-1 selected in step S105 from the recording medium 50. In this example, the hierarchy data units respectively corresponding to the access data units have been copied to prescribed positions (for example, prescribed addresses) on the recording medium 50. Thus, the hierarchy data unit 151-1 of hierarchy level 1 corresponding to the access data unit 201-1 is read from the prescribed position.

The hierarchy data unit 151-1 of hierarchy level 1 is read from the recording medium 50 on a time section-by-time section basis. For example, a hierarchy data unit of hierarchy level 1 in the first time section (block) is first read from the recording medium 50. Next, a hierarchy data unit of hierarchy level 1 in the second time section is read from the recording medium 50. The timing for reading the hierarchy data unit of hierarchy level 1 in the second time section is controlled by, for example, the read section 43. Namely, the reading of the hierarchy data unit of hierarchy level 1 in the second time section begins once a prescribed time period after the start of the reading of the hierarchy data unit of hierarchy level 1 in the first time section has elapsed. The prescribed time period is the length of the first time section.

The hierarchy data unit of hierarchy level 1 in each time section (block) has its time section number added thereto when the data unit is read by the read section 43.

The block counter 63 records the added time section number. The time section number represents a time section of the hierarchy data unit of hierarchy level 1 which is being currently read, namely, the time section of the hierarchy data unit to be reproduced next. When the hierarchy data unit of hierarchy level 1 in a next time section is read, the block counter 63 transfers data representing the number of the next time section to the block designation section 71.

The block designation section 71 transfers a receiving block request 761 including the data representing the time section number to the communication section 42 for all time sections. The receiving block request 761 is sent to the server 21.

Step S1108: Based on the storage address 252 of the key information section 241 of the access data unit 201-1 which is being used for the transmission request, the communication section 23 of the server 21 retrieves the acoustic data unit corresponding to the access data unit 201-1 from the N acoustic data units stored in the storage section 22. The hierarchy data unit 161-1 of hierarchy levels 2 through K of the retrieved acoustic data unit is sent from the server 21 and received by the communication section 42 through the wireless communication. Thus, the access data unit 201-1 is used for requesting the server 21 to transmit the hierarchy data units of hierarchy levels 2 through K (each being a second data unit).

The hierarchy data unit 161-1 of hierarchy levels 2 through K is sent and received on a time section-by-time section basis. For example, hierarchy data units of hierarchy levels 2 through K in the first time section (blocks) are first sent from the server 21 in this order. Next, hierarchy data units of hierarchy levels 2 through K in the second time section are sent from the server 21 in this order. Each block sent includes data representing its hierarchy level number added thereto.

When receiving the receiving block request 761 for each time section, the server 21 sends the hierarchy data units of hierarchy levels 2 through K in the time section based on the data representing the number of time section included in the receiving block request 761 to the reproduction apparatus.

According to the above-described structure, the server 21 need not control the timing for sending the hierarchy data units of hierarchy levels 2 through K, and needs only to send the hierarchy data units of hierarchy levels 2 through K in response to the receipt of the receiving block request 761.

When the reproduction apparatus is constructed so that the user can designate an arbitrary time section of the acoustic data unit, the acoustic data unit (hierarchy data unit) of the time section designated by the user can be reproduced. This realizes forwarding and rewinding operations for the acoustic data unit.

The time section designated by the user (it is assumed that, for example, a jth time section is designated) is output by the block designation section 71 as the receiving block request 761 and a reading block request 762 respectively to the communication section 42 and the read section 43.

As described above, the receiving block request 761 is sent to the server 21. In response, the server 21 sends the hierarchy data units of hierarchy levels 2 through K in the jth time section to the reproduction apparatus. The reproduction apparatus receives these hierarchy data units.

In response to the reading block request 762, the read section 43 reads the hierarchy data unit of hierarchy level 1 in the jth time section from the recording medium 50.

The hierarchy data units of hierarchy levels 2 through K received by the reproduction apparatus and the hierarchy data unit of hierarchy level 1 read from the recording medium 50 are decoded as described in the first example, and the decoded hierarchy data units are synthesized into a synthesis data unit. The synthesis data unit is reproduced.

EXAMPLE 3

In the first and second examples of the present invention, only the hierarchy data unit of hierarchy level 1 is recorded on the recording medium 50 in all time sections. Therefore, in order to reproduce the acoustic data unit at the maximum sound quality, it is necessary to wait until all hierarchy data units of hierarchy levels 2 through K in at least the first time section are completely received.

In a third example of the present invention, the recording medium 50 has the hierarchy data units of hierarchy levels 2 through K in the first time section recorded thereon, in addition to the hierarchy data unit of hierarchy level 1 in all time sections. In other words, the hierarchy data units of hierarchy levels 1 through K in the first time section and the hierarchy data unit of hierarchy level 1 in the second time section, et seq. are recorded on the recording medium 50.

Figure 8:
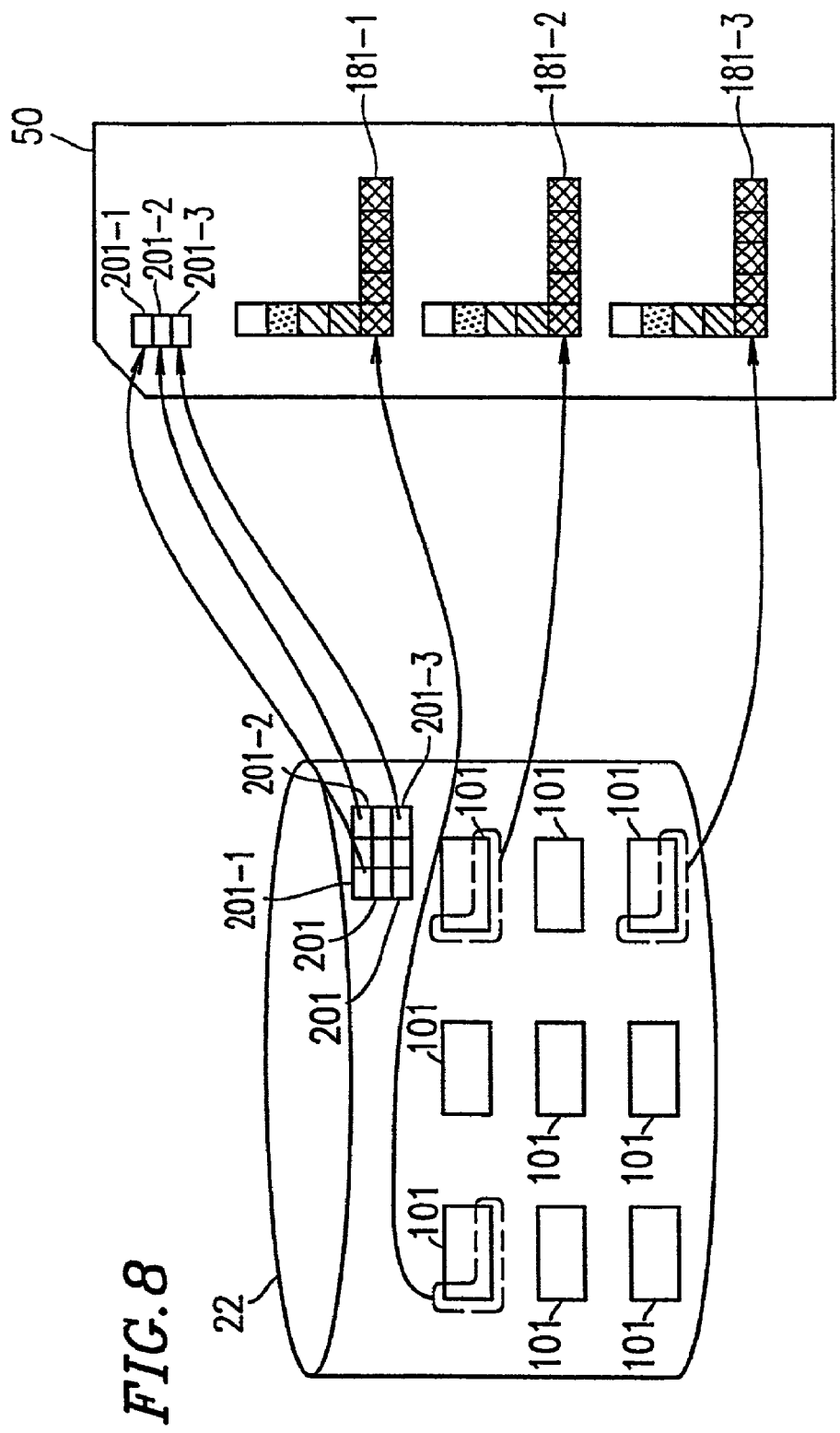
FIG. 8 shows a manner in which hierarchy data units of hierarchy levels 1 through K in a first time section and a hierarchy data unit of hierarchy level 1 in a second time section, et seq. of an acoustic data unit are copied onto a recording medium 50 according to a third example of the present invention.

FIG. 8 shows a manner in which the hierarchy data units of hierarchy levels 1 through K in the first time section and the hierarchy data unit of hierarchy level 1 in the second time section, et seq. of the acoustic data unit are copied onto the recording medium 50.

The example shown in FIG. 8 is different from the example shown in FIG. 3 in relation to the hierarchy data units copied onto the recording medium 50.

In the third example, data units 181-1 through 181-3, which are respective portions of the three acoustic data units selected by the user are recorded on the recording medium 50. Each of the data units 181-1 through 181-3 is an assembly of the hierarchy data units of hierarchy levels 1 through K in the first time section and the hierarchy data unit of hierarchy level 1 of the second time unit, et seq. of the acoustic data unit 101. Namely, the recording medium 50 has the hierarchy data units of hierarchy levels 2 through K in the first time section (each being a second data unit) recorded thereon in addition to the hierarchy data units in the first example. In the third example, the hierarchy data units of hierarchy levels 2 through K in the first time section are not sent from the server 21 and are read from the recording medium 50 instead. In general, the hierarchy data units of hierarchy levels 2 through K are read from the recording medium 50 in a shorter period of time than received from the server 21.

The recording medium 50 also has access data units 201-1 through 201-3 respectively corresponding to three acoustic data units selected by the user.

In the example shown in FIG. 8, the user copies the hierarchy data unit of hierarchy 1 from the storage section 22 of the server 21 onto the recording medium 50. Alternatively, the recording medium 50 can have hierarchy data units of hierarchy levels 1 through K in the first time section and the hierarchy data unit of hierarchy level 1 in the second time section, et seq. of an acoustic data unit corresponding to a user's favorite music program recorded thereon in advance. In this case, the storage section 22 of the server 21 need not have the hierarchy data unit of hierarchy level 1 in all time sections and the hierarchy data units of hierarchy levels 2 through K in the first time section stored therein.

Figure 9:
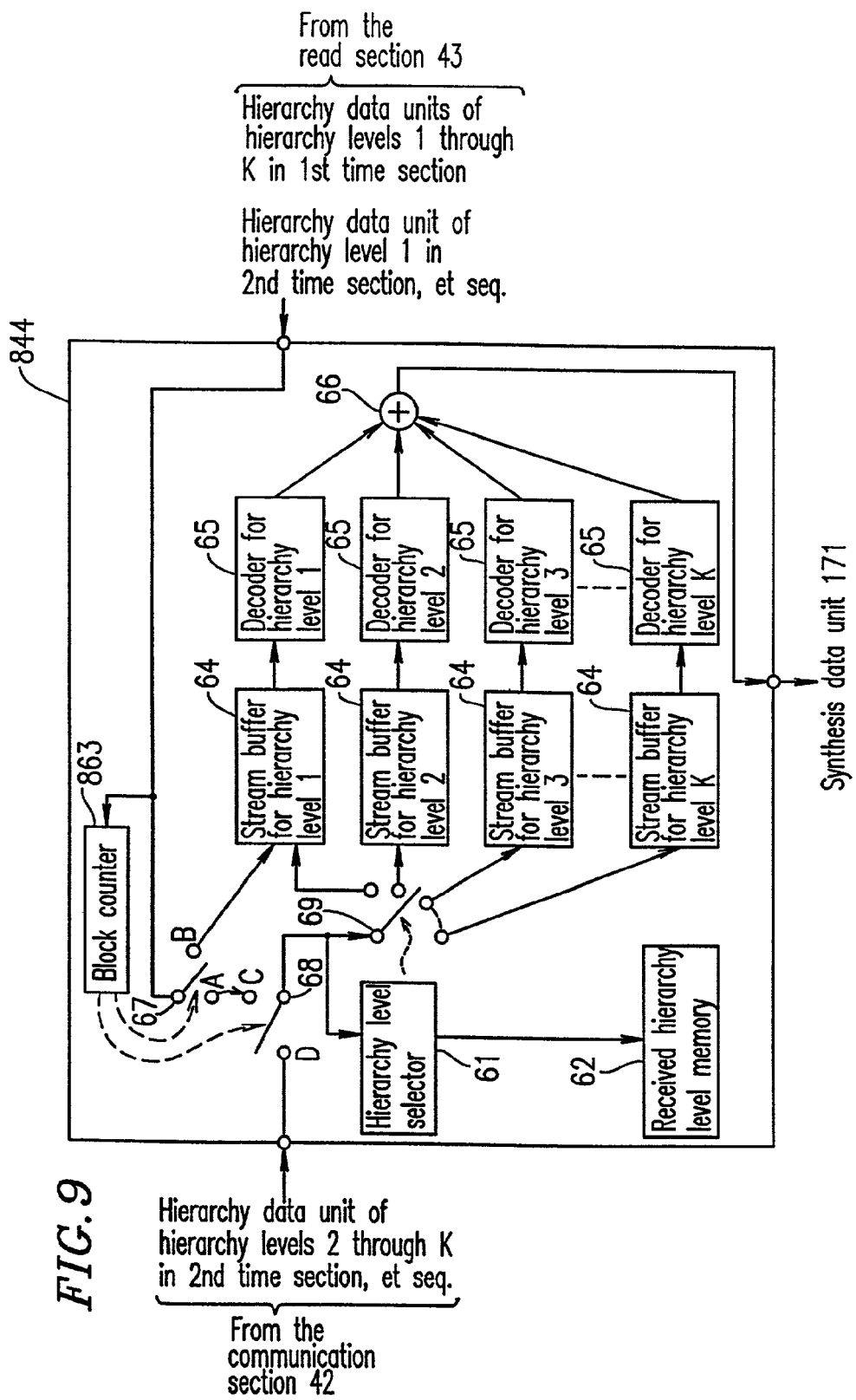
FIG. 9 is a block diagram illustrating a structure of a synthesis section 844 according to the third example of the present invention.

FIG. 9 shows a structure of a synthesis section 844 according to the third example of the present invention. The synthesis section 844 can be used, for example, instead of the synthesis section 44 described in the first example. In FIG. 9, identical elements previously discussed with respect to FIG. 6 bear identical reference numerals and the detailed descriptions thereof are omitted.

The synthesis section 844 includes a block counter 863.

In the third example, the hierarchy data unit of hierarchy level 1 of each time section (block) has data representing its hierarchy level number added thereto. The hierarchy data units of hierarchy levels 1 through K in the first time section each has data representing its hierarchy level number added thereto when read by the read section 43.

Based on the data representing the added time section number, the block counter 863 switches 67 and 68.

Hereinafter, reproduction of an acoustic data unit by a reproduction apparatus including the synthesis section 844 will be described.

For reproducing an acoustic data unit, processing similar to steps S101 through S107 described in the first example is performed so as to send the content of the key information section 241 of the access data unit 201-1 to the communication section 23 of the server 21. In response, the server 21 sends the hierarchy data units of hierarchy levels 2 through K in the second time section, et seq. to the reproduction section 45.

For the hierarchy data units in the first time section, the following processing is performed instead of steps S108 through S110 described in the first example.

The reproduction apparatus reads the hierarchy data units of hierarchy levels 1 through K in the first time section from the recording medium 50. The hierarchy data unit of hierarchy 1 includes data representing its time section number "1" added thereto. Based on the data, the block counter 863 switches the switch 67 to a contact A and switches the switch 68 to a contact C. Based on the data representing the hierarchy level number added to each of the hierarchy data units of hierarchy levels 1 through K in the first time section, the hierarchy level selector 61 switches the switch 69 so as to store the hierarchy data units of hierarchy levels 1 through K in the first time section in the respective stream buffers 64 for hierarchy levels 1 through K. The hierarchy data unit stored in each stream buffer 64 is decoded by the corresponding decoder 65. The decoder 65 decodes the hierarchy data unit without referring to the flag of the received hierarchy level memory 62. The reason for this is because the stream buffers 64 for hierarchy levels 1 through K store the hierarchy data units of the corresponding hierarchy levels with certainty.

The hierarchy data units decoded by the decoders 65 are synthesized by the synthesis device 66 so as to generate a synthesis data unit 171. The synthesis data unit 171 is output to the reproduction section 45 as a second output data unit.

While the reproduction apparatus is reproducing the acoustic data unit (hierarchy data units) in the first time section, the hierarchy data units in the second time section sent from the server 21 are completely received.

The reproduction apparatus reads the hierarchy data unit of hierarchy level 1 in the second time section from the recording medium 50. The hierarchy data unit includes data representing its time section number "2" added thereto. Based on the data, the block counter 863 switches the switch 67 to a contact B and switches the switch 68 to a contact D. After this, the synthesis section 844 performs similar operations to those of the synthesis section 44 described in steps S108 through S110 in the first example.

In the third example, the recording medium 50 has the hierarchy data units of hierarchy levels 1 through K in the first time section and the hierarchy data unit of hierarchy level 1 in the second time section, et seq., and the synthesis section 844 has the above-described structure. Due to such a system, the wait time period required from the selection by the user of the acoustic data unit to be reproduced until the start of the reproduction of the acoustic data unit by the reproduction apparatus can be reduced. The reason for this is because it is not necessary to wait for the hierarchy data units sent from the server 21 to be completely received before starting the reproduction.

The synthesis section 844 in the third example can further include the block designation section 71 described in the second example. In this case, the user can designate a desired time section, and the reproduction apparatus can reproduce the acoustic data (hierarchy data unit) in the designated time section.

In the above example, the hierarchy data unit of hierarchy level 1 and hierarchy data units of hierarchy levels 2 through K are recorded on the recording medium 50 only for the first time section. Alternatively, the recording medium 50 can have the hierarchy data unit of hierarchy level 1 and the hierarchy data units of hierarchy levels 2 through K can be recorded on the recording medium 50 for a plurality of time sections which have a relatively high possibility of being designated by the user.

As described above, in the third example, the recording medium 50 has at least a portion of the hierarchy data units of hierarchy levels 2 through K (each hierarchy data unit being a second output data unit) recorded thereon, in addition to the hierarchy data unit of hierarchy level 1 in all time sections. The read section 43 in the reproduction apparatus reads at least a portion of the hierarchy of the hierarchy data unit of hierarchy level 1 (first data unit) and at least a portion of the hierarchy data units of hierarchy levels 2 through K from the recording medium 50 in at least a portion of the reproduction time period. The synthesis section 844 synthesizes the at least a portion of the first data unit and the at least a portion of the second data unit in the at least a portion of the reproduction time period, regardless of the communication condition with the server 21.

Due to such a system, when reproduction of an acoustic data unit for at least a portion of the reproduction time period is designated by the user, the wait time period before starting the reproduction can be reduced.

According to the present invention, only a portion of an acoustic data unit (first data unit) needs to be recorded on a recording medium. Accordingly, a larger number of acoustic data units (i.e., acoustic data units having a longer total reproduction time period) can be recorded on a recording medium having a prescribed capacity. Even when the communication condition is poor and as a result the reproduction apparatus cannot receive a second data unit, a first data unit read from the recording medium can be reproduced. Therefore, the sound quality of a prescribed level (for example, a minimum permissible level) or higher is guaranteed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction apparatus, comprising:
   a read section for reading a first data unit from a recording medium having the first data unit recorded thereon;
   a communication section for receiving a second data unit in accordance with a communication condition with a server;
   a synthesis section for, when the communication section cannot receive the second data unit in accordance with the communication condition, outputting the first data unit as a first output data unit, and when the communication section can receive the second data unit in accordance with the communication condition, synthesizing the first data unit and the second data unit so as to generate a synthesis data unit and outputting the synthesis data unit as a second output data unit; and
   a reproduction section for reproducing the first output data unit and the second output data unit,
   wherein the first data unit and the second data unit are constructed so that a sound quality of reproduction of the second output data unit is higher than a sound quality of reproduction of the first output data unit; and
   the first data unit and the second data unit originates from hierarchy-encoded data unit.

2. A reproduction apparatus according to claim 1, wherein the read section reads, from the recording medium, an access data unit for requesting the server for transmission of the second data unit.

3. A reproduction apparatus according to claim 1, wherein the first data unit, the second data unit, and the access data unit correspond to a common music program which is common to the first data unit and the second data unit, and the access data unit includes inherent information representing attribute information of the common music program.

4. A reproduction apparatus according to claim 3, wherein:
   the recording medium has a plurality of first data units respectively corresponding to a plurality of music programs, and
   the reproduction apparatus further includes a selection section for displaying the inherent information of the access data unit corresponding to each of the plurality of music programs and receiving an input for designating the music program based on the inherent information displayed.

5. A reproduction apparatus according to claim 1, wherein:
   the recording medium has at least a portion of the second data unit recorded thereon,
   the read section reads at least a portion of the first data unit and the at least a portion of the second data unit from the recording medium in at least a portion of a reproduction time period, and the synthesis section synthesizes the at least a portion of the first data unit and the at least a portion of the second data unit in the at least a portion of the reproduction time period regardless of the communication condition with the server.

6. A reproduction apparatus according to claim 1, wherein the first data unit is divided into a plurality of blocks along a time axis, the second data unit is divided into a plurality of blocks respectively corresponding to the plurality of blocks of the first data unit, and the synthesis section sequentially synthesizes the first data unit and the second data unit on a block-by-block basis.

7. A music delivery system comprising:

a reproduction apparatus; and a server for providing information to the reproduction apparatus, wherein the reproduction apparatus includes:

a read section for reading a first data unit from a recording medium having the first data unit recorded thereon;

a first communication section for receiving a second data unit in accordance with a communication condition with a server;

a synthesis section for, when the communication section cannot receive the second data unit in accordance with a communication condition, outputting the first data unit as a first output data unit, and when the communication section can receive the second data unit in accordance with a communication condition, synthesizing the first data unit and the second data unit so as to generate a synthesis data unit and outputting the synthesis data unit as a second output data unit; and a reproduction section for reproducing the first output data unit and the second output data unit, wherein the server includes:

a storage section for storing the second data unit; and a second communication section for sending the second data unit to the reproduction apparatus, and wherein the first data unit and the second data unit are constructed so that a sound quality of reproduction of the second output data unit is higher than a sound quality of reproduction of the first output data unit; and the first data unit and the second data unit originates from hierarchy-encoded data unit.

* * * * *

UNITED STATES PATENT AND TRADEMARK OFFICE
CERTIFICATE OF CORRECTION

| | |
|---|---|
| PATENT NO. | : 7,050,870 B2 |
| APPLICATION NO. | : 09/982272 |
| DATED | : May 23, 2006 |
| INVENTOR(S) | : Masahiro Sueyoshi et al. |

It is certified that error appears in the above-identified patent and that said Letters Patent is hereby corrected as shown below:

In claim 1, column 18, lines 36-37, should read: "the first data unit and the second data unit [originates] originate from a hier
.archy-encoded data unit."

In claim 7, column 20, lines 21-22, should read: "the first data unit and the second data unit [originates] originate from a hierarchy-encoded data unit."

Signed and Sealed this

Seventeenth Day of October, 2006

JON W. DUDAS
*Director of the United States Patent and Trademark Office*